D. N. BEARD.
SUSPENDER FOR STOVE HANDLES, &c.
No. 76,977.
Patented Apr. 21, 1868.
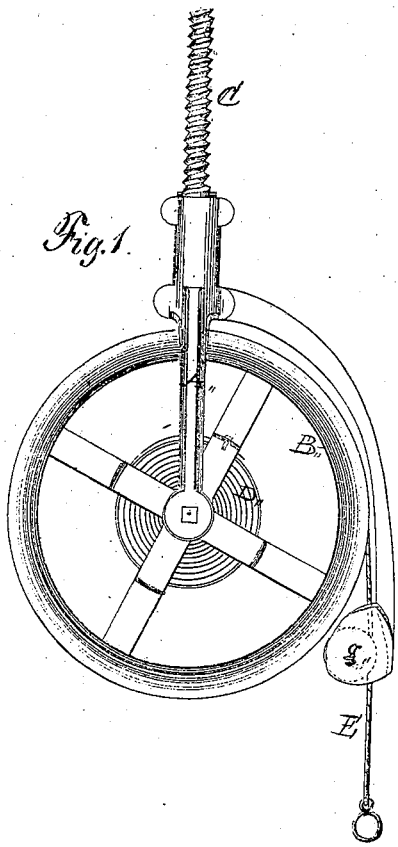
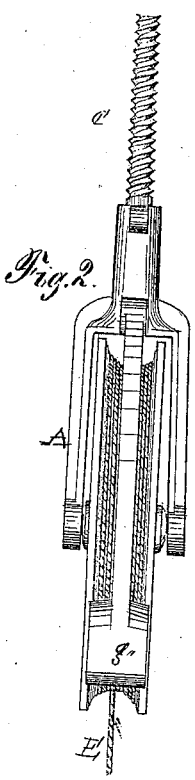
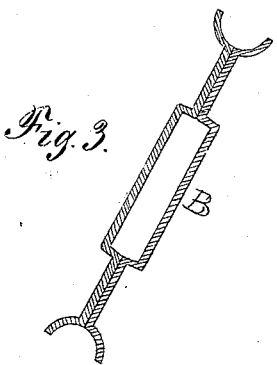
Daniel N. Beard

United States Patent Office.

SEWEL G. THAYER, ADMINISTRATOR OF THE ESTATE OF DANIEL N. BEARD, DECEASED OF CLEVELAND, OHIO.

*Letters Patent No. 76,977, dated April 21, 1868.*

IMPROVED SUSPENDER FOR STOVE-HANDLES, &c.

*The Schedule referred to in these Letters Patent and making part of the same.*

TO ALL WHOM IT MAY CONCERN:

Be it known that I, DANIEL N. BEARD, of Cleveland, State of Ohio, have invented new and useful Improvements in Elastic Holders or Suspenders for Stove-Hooks and other similar purposes; and I do hereby declare the following to be a full and exact description of the same, reference being had to the drawings that accompany and form a part of these specifications, in which—

Figure 1 is a front view of the device.

Figure 2, edgewise view.

Figure 3, section of pulley.

Letter A, frame for supporting the wheel.

Letter B, wheel grooved in the edge.

Letter C, screw for fastening the machine.

Letter D, a spring.

Letter E, a cord, one end attached to the spring D; to the other is attached the article to be held or suspended.

A stove-hook is often out of place, and not easily found, but in this case it must be attached to the cord of my device, which could be screwed up overhead.

This device may be of use in being placed to hold one or more towels at the wash-stand, or to hold the hand-oiler in the mechanic's shop, and for many other similar purposes.

The spring is so attached to the cord, that when the cord is wound up on the wheel B, the spring D will be unwound; so, by taking hold of the hook or the towel, or whatever article is attached, and carrying it away a distance, the cord unwinds from the wheel B, at the same time the spring winds up; so, when the article in hand is released, the spring reacts and winds up the cord. A swivel-joint at e enables the wheel to turn to any direction.

What I claim as of my invention, and desire to secure by Letters Patent, is—

The wheel B, when provided with guide g, the swivel-screw C, spring D, and cord E, as and for the purposes specified.

In testimony whereof, I have signed my name to this specification in the presence of two subscribing witnesses.

DANIEL N. BEARD.

Witnesses:
D. C. COLBY,
CHAS. H. POOLE.